United States Patent Office 3,306,967
Patented Feb. 28, 1967

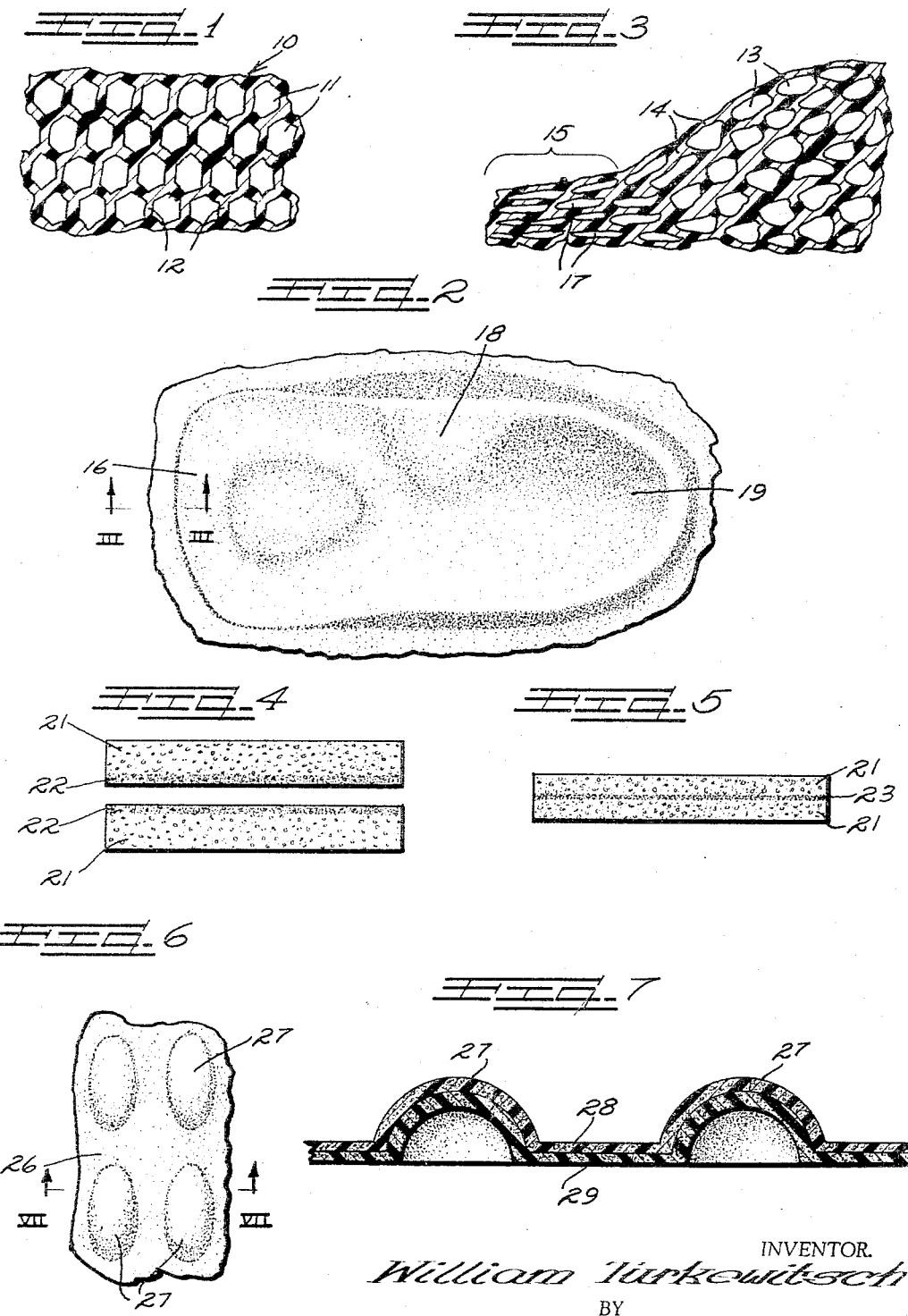

3,306,967
MOLDING OF RESINOUS FOAMS
William Turkewitsch, Toronto, Ontario, Canada, assignor to The Scholl Mfg. Co., Inc., Chicago, Ill., a corporation of New York
Filed Aug. 12, 1963, Ser. No. 301,282
4 Claims. (Cl. 264—321)

The present invention deals with the molding of resinous foams in the manufacture of new articles of manufacture.

It has always been difficult to mold resinous foams properly, since great care has to be taken if the desired foam structure is to be maintained in the article. Molding of the resinous foams at temperatures approaching the softening or melting point of the material may cause collapse of the reticulated foam structure and possibly complete fusion in which case the desired foam structure is completely lost. Attempts to mold the foam material at lower temperatures, well below the softening point to thereby preserve the desired reticulate structure are difficult and time consuming to carry out because they require a considerable length of time to heat the foam material evenly and thoroughly in order to achieve the desired shape. For example, polyurethane foam can be molded at temperatures of 360 to 400° F. in cycles of 8 to 20 minutes or at a range of 300 to 360° F. in cycles of 30 to 120 minutes, depending upon the chemical composition of the foam and its physical properties. The times involved are sufficiently long so that they are not attractive commercially. Furthermore, once the molding has been completed, the products made are irreversibly shaped and cannot be remolded conveniently.

The present invention overcomes these disadvantages and provides a method for molding foamed resinous materials at relatively low temperature and at short time cycles. Furthermore, the materials produced according to the present invention have a spring back characteristic which enables the molded material to recover its original shape simply by the application of heat in the molded areas for relatively short periods of time.

It is accordingly an object of the present invention to provide an improved molding process for resinous foams without requiring very high temperatures or extended heating periods.

Still another object of the invention is to provide a method for molding resinous foams in which the foam material is selectively compressed and shaped without destroying the cellular character of the material.

Still another object of the invention is to provide an improved method for molding resinous foams which is reversible to the extent that the original shape can be restored, if desired, by the simple application of heat.

Another object of the invention is to provide an improved method for the manufacture of a molded, foam resin product which maintains its reticulate character even in the molded areas.

A further object of the invention is to provide an improved method for the manufacture of molded foam resinous product having selected areas of compressed and shaped structure and other areas of substantially uncompressed, highly porous character.

A further object of the invention is to provide an improved method for the manufacture of laminated structure of resin foamed skeletons.

In accordance with the present invention, I produce molded articles having a foamed resinous skeleton by first providing a flexible resinous foam in which the cell walls of the foam contain deposits of a thermoplastic resinous composition which has a softening point below the softening point of the foam skeleton. This composite material is heated to a temperature sufficient to at least soften the deposits of the resinous composition, and a shaping pressure is applied to the foam while the deposits are softened. The foam is thereby deformed or shaped into a desired configuration after which the shaped foam is cooled while still under pressure to provide a structure in which the shaped foam is maintained in its shaped condition by the solidification of the thermoplastic resinous deposits.

The preferred materials for use in connection with the present invention are polyurethane foams either of the polyether or polyester type, and thermoplastic resins for bonding purposes consisting of polyvinyl chloride, or polyvinyl acetate, preferably in the form of plastisols. Preferably, the polyurethane foam is impregnated with a gelled plastisol of the thermoplastic resin containing a sufficient amount of a plasticizer to make the resin heat-gelable. Compositions of this type have been described and claimed in Schickedanz U.S. Patent No. 3,061,460 owned by the same assignee as the present application.

While the plastisols represent the preferred material for use in accordance with the present invention, any thermoplastic vinyl resinous compound, homopolymer or copolymer can be used, including emulsions, provided the resinous material has a lower melting point than the foam skeleton.

The preferred foam materials, the polyurethane resins, are polymeric materials in which residues of polyisocyanate compounds form a part of the polymer chain, acting as chain-extending and cross-linking agents to form polymeric molecules of high molecular weight. In the production of such foams, isocyanate radicals in the polymer chain are caused to react to form carbon dioxide, resulting in the evolution and expansion of the gas to produce a cellular foamed product.

The thermoplastic resinous material which is incorporated into the foam need not impregnate the foam completely as, for many purposes, it is sufficient that a surface layer of the thermoplastic material of lower softening point appear at the surface of the foam which is to be bonded. This type of structure is particularly useful where it is desired to laminate together two similar foam structures.

In any event, the thermoplastic material contained within or along the cell walls of the foam does not completely impregnate and fill the pores of the cellular structure. Most of the inherent porosity of the foamed resinous composition is thus retained together with the advantages of low density and rapid recovery after the application of compressive loads at ordinary temperatures.

The ratio of foam to thermoplastic resin within the foam can vary widely but it is generally desirable to use from 20 to 70% by weight of the foamed skeleton in combination with 80 to 30% by weight of the thermoplastic resin.

There are several methods suitable for the production of the improved product of the present invention. In each case, however, the method involves heating the thermoplastic resin-laden foam to a shaping temperature, generally on the order of 290 to 350° F. whereupon the thermoplastic material will at least soften, and when a shaping pressure is applied to the material in the thus softened condition, causing a compresion of the cellular walls and distortion of the wall structure, the thermoplastic resinous material will collect in the corners of the cell walls. Upon cooling of this material below its softening temperature, while the pressure is still applied, the deposits of congealed thermoplastic resin which form provide a very effective bonding means for locking the cellular structure in its deformed condition. Upon subseqent application of heat, however, sufficient to soften the thermoplastic material again, the foam has the ability to spring back to its original shape upon the redistribution of the thermoplastic resinous deposits. Care should be exercised not to apply so much compressive or shaping pressure that the cell walls are substantially ruptured. It is accordingly preferred that the compressive force applied to a given area of the foam should be no more than required to compress the foam to a thickness of about 25 to 80% of its original thickness.

One method for accomplishing the molding of the present invention involves preheating the foamed resin with the thermoplastic deposits in it in hot air at a temperature of about 290 to 350° F., followed by subsequent molding in a cold mold. Alternatively, the resinous foam can be heated in a mold to the same range of temperatures and then cooled in the mold while the pressure is being applied. In still another form of the invention, the resinous foam with the thermoplastic resin in it can be preheated in the mold to a temperature of 290 to 350° F. and then transferred to a cold mold for the shaping operation.

Typically, the times required for these molding procedures range between 1 and 2 minutes plus an additional few seconds to permit the thermoplastic material to set. This time interval can vary, of course, depending upon the type of skeleton material, the composition of the thermoplastic resin, the density, and the thickness of the reinforced foams.

Still another technique involves the dielectric heating and molding of the skeleton foam containing the thermoplastic material in which times of only 4 to 6 seconds with a dwell time for cooling and setting of approximately 5 seconds are required. Frequencies of 25 to 75 megacycles, and voltages of 5,000 to 12,000 volts can be used, depending upon the chemical composition of the foam, its density, its thickness, and the area to be treated. High frequency microwave heating may also be utilized.

The process of the present invention thus provides substantially shorter processing times for molding than have heretofore been used. The foam products produced according to the present invention include a compressed, resilient reticulated skeleton held in compressed unbroken form and shape by the thermoplastic material. Recovery of the original shape and thickness upon reheating to temperatures of 270 to 330° F. establishes that only the thermoplastic material participates in the bonding, and not the skeleton.

The articles produced according to the present invention find use in a wide variety of structures. They can be made in flat sheet form, in any geometric shape or in combinations of shapes. The products of the present invention are useful in many fields including waistband linings, shoulder pads, insoles, arch and metatarsal supports, bunion shields, toe caps, cups, cones, and the like. The materials which are produced according to the present invention are still air permeable and capable of "breathing" as long as the compression is controlled to the point short of complete collapse and fusion of the reticulate network.

The product of the present invention can also be laminated together without losing their porosity, and are amenable to further lamination with layers of fabrics such as cotton, nylon, and the like, as well as porous film materials applied to one or both sides of the foam, or between two layers of foam.

A further description of the present invention will be made in conjunction with the accompanying drawings in which:

FIGURE 1 is a substantially magnified view of the normal cellular structure of polyurethane foam;

FIGURE 2 is a plan view of a molded arch support produced in accordance with the present invention;

FIGURE 3 is a cross-sectional view taken substantially along line II—II of FIGURE 2, in highly magnified form, to illustrate the cellular structure of the finished article;

FIGURE 4 is an exploded view of a pair of sheets of cellular foam in opposed relation prior to lamination;

FIGURE 5 is a view similar to FIGURE 4 but showing the sheets after lamination;

FIGURE 6 is a plan view of a bunion pad molding produced according to the present invention; and FIGURE 7 is a cross-sectional view of the molding shown in FIGURE 6.

As shown in the drawings:

In FIGURE 1, reference numeral 10 indicates generally a section of typical polyurethane foam consisting of generally polygonal cells 11 formed by a network of thin cell walls 12. After the polyurethane foam has been treated with the thermoplastic resinous composition, the shape of the cells 11 is modified somewhat as illustrated in FIGURE 3 by cells 13 which are more of a rounded configuration. The deposits of the theremoplastic material, while not discernible to the eye even under substantial magnification, provide somewhat thicker cell walls 14 in the treated product than in the untreated product.

It should also be noted in FIGURE 3 that the area in which substantial compression has occurred, such as are a 15 causes a substantial distortion of the shape of the cells, to a generally elongated form designated by reference numeral 17. In the compressed area 15, the thermoplastic resin deposits have merged to some extent and, upon solidification have collapsed the foam structure without, however, destroying the inherent resiliency of the foamed material.

One product to which the invention is particularly applicable is the type of arch support shown in FIGURE 2 of the drawings. This structure includes a highly compressed toe portion 16 and a relatively uncompressed arch support portion 18, and a moderately compressed heel portion 19.

The improved products of the present invention can also be made as laminates as illustrated in FIGURES 4 and 5 of the drawings. In FIGURE 4, reference numeral 21 has been applied to a base skeleton of a polyurethane foam which has been partly impregnated or treated to provide a surface layer 22 of the thermoplastic material within or along the walls of the cellular structure. Upon subjecting the two identical foam structures to conditions of heat and pressure, a laminated structure of the type shown in FIGURE 5 results in which the two foam skeletons 21 are securely bonded together at an interface 23 provided by the fusion and resolidification of the thermoplastic resinous material contained in the original skeleton.

Still a further modification for the invention has been depicted in FIGURES 6 and 7 which illustrate a sheet 26 in which there has been molded a plurality of bunion pads 27. The sheet 26 is of laminated form as illustrated in FIGURE 7, consisting of an upper foam sheet 28 and a lower sheet 29 both of which have the thermoplastic resinous material contained therein, at least at the abutting surfaces of the sheets. For particularly decorative effects, the sheets 28 and 29 can be made of different colored foams.

There are numerous modifications in structure possible in accordance with the present invention. For example, a laminated structure can be built up consisting of one portion of the polyurethane foam alone and the other portion of foam having a thermoplastic resinous material contained in it. Alternatively, I can build up a sheet consisting of a central layer of the foam material and superimposed outer layers of the resin filled foam which are bonded to the untreated skeleton by the heating and compression steps previously described. The inner skeleton layer in this instnace creates a special cushioning effect for the composite.

Articles molded from the types of foam described herein demonstrate a considerable resistance to ultraviolet radiation and can be exposed to direct sunlight for months without noticeable discoloration. In contrast, normal polyurethane foams whether of the ester or ether type, colored in the conventional manner, are not particularly stable to light.

The following specific examples illustrate the method of the present invention as applied to the manufacture of different types of articles.

Example I

In this and the succeeding examples, a conventional polyurethane flexible foam was treated with a vinyl composition having the following constituents:

| | Parts by weight |
|---|---|
| Polyvinyl chloride | 50 |
| Ester plasticizer (dibutyl or dioctyl phthalate) | 50 |
| Vinyl stabilizer | 1½ |
| Calcium carbonate | 10 |
| Octyl epoxy stearate | 5 |

Two pieces of ¼ inch treated foam were heated to 360° F. in hot air for 4 minutes and then placed in a cold mold for 1 minute to form a shoulder pad. The composite material was compressed to a thickness of approximately ⅜ inch in the body portion, and tapered to a minimum dimension of about ⅛ inch thickness at the edges. Complete bonding of the two foam structures resulted.

Example II

One layer of 3/16 inch white and one layer of 3/16 inch yellow polyurethane foam containing the polyvinyl chloride were covered with a stretch nylon fabric on top and bottom and heated in a mold for making metatarsal pads for 2 minutes at 360° F. The center was compressed to a thickness of 4/16 inch and tapered to a dimension of 1/16 inch at the edges. The foam materials were completely laminated together, and the fabric layers were securely bonded to the foam.

Example III

One layer of ½ inch laminate consisting of two sheets, each 3/16 inch of the plastic treated polyurethane foam and a central layer of ⅛ inch thickness of untreated foam were covered with a stretch cotton fabric at the top and bottom, preheated for 90 seconds in a conical mold of 6 inches in diameter and 3 inches in depth to a temperature of 350° F. The composite structure was then transferred to a cold male and female conical mold for 10 seconds. This resulted in a molded conical article with a wall thickness of ¼ inch tapering to ⅛ inch in the center and with the fabric securely laminated to it.

Example IV

One layer of 3/16 inch white and one layer of 3/16 inch yellow plastic treated polyurethane foam were covered with a stretch cotton fabric on the top and the bottom and exposed to dielectric heating in an aluminum metatarsal pad mold. Compression of the laminate in an electronic press at 1 kilowatt for 6 seconds with a dwell time of another 6 seconds resulted in a pair of molded metatarsal pads from which the fabric could easily be stripped and reused again.

Example V

One layer of ½ inch plastic treated foam was placed in a preheated aluminum mold for an insole with metatarsal and longitudinal arch elevated between layers of stretch nylon and exposed at a temperature of 360° F. in a ten ton press for 90 seconds, and cooled. The resultant molded piece was die cut to final outline. The fabric was solidly laminated to the porous piece which had an overall length of 7 inches, a minimum thickness of ⅛ inch, and a thickness of approximately ¼ inch at the elevation.

Example VI

Toe caps of one piece ⅛ inch plastic treated foam were made in multiple molds by either pressing at 350° F. for approximately 3 minutes or induction heating for 60 seconds with an additional dwell time of 5 seconds.

It should be evident that various other modifications can be made to the described embodiments without departing from the scope of the present invention.

I claim as my invention:

1. The method of producing molded articles having a foamed resinous skeleton which comprises providing a flexible resinous foam in which the cell walls of the foam contain deposits of a thermoplastic resinous composition in an amount insufficient to close off the cells of said foam, said composition having a softening point below the softening point of the foam skeleton, heating said foam to a temperature sufficient to soften the deposits of said resinous composition, applying a shaping pressure to selected areas of said foam while said deposits are softened to thereby deform the selected areas of the foam into a desired configuration without destroying the cellular character of the foam, said shaping pressure reducing the thickness of the shaped areas to not less than 25% of their original thickness, and cooling the shaped foam while still under said pressure to thereby provide a structure in which the selected areas of the deformed foam are maintained in their deformed condition by the solidification of said deposits.

2. The method of claim 1 in which said foamed resinous skeleton consists of a polyurethane foam.

3. The method of claim 1 in which said thermoplastic resinous composition contains a resin selected from the group consisting of polyvinyl chloride and polyvinyl acetate.

4. The method of claim 1 in which said thermoplastic resinous composition is a polyvinyl chloride plastisol.

References Cited by the Examiner

UNITED STATES PATENTS

| | | | |
|---|---|---|---|
| 2,466,735 | 4/1949 | Piazze | 156—331 XR |
| 2,666,954 | 1/1954 | Potter | 264—243 XR |
| 2,759,475 | 8/1956 | Van Swaay | 264—321 XR |
| 2,766,809 | 10/1956 | Parham | 156—331 XR |
| 2,767,436 | 10/1956 | Noland et al. | 264—321 |
| 2,867,222 | 1/1959 | Otto et al. | 264—321 XR |
| 2,878,153 | 3/1959 | Hacklander | 264—321 XR |
| 2,964,424 | 12/1960 | Mast | 117—98 |
| 3,000,464 | 9/1961 | Watters | 264—321 XR |
| 3,061,460 | 10/1962 | Schickedanz. | |
| 3,094,433 | 6/1963 | Bugosh et al. | 117—98 |
| 3,103,408 | 9/1963 | Chen et al. | 264—321 |
| 3,125,621 | 3/1964 | Coppick | 264—321 |
| 3,180,778 | 4/1965 | Rinderspacher et al. | 156—311 |
| 3,189,669 | 6/1965 | Goldfein | 264—321 XR |
| 3,193,441 | 7/1965 | Schafer | 156—242 XR |
| 3,193,598 | 7/1965 | Schafer | 264—321 XR |

ALEXANDER H. BRODMERKEL, *Primary Examiner.*

P. E. ANDERSON, *Assistant Examiner.*